July 31, 1956     E. F. SEGERBLOM     2,756,758

TEETH CLEANING IMPLEMENT

Filed Feb. 23, 1954

INVENTOR
ESKIL F. SEGERBLOM
BY Williamson, Williamson,
Schroeder & Adams
ATTORNEYS

United States Patent Office 2,756,758
Patented July 31, 1956

2,756,758

TEETH CLEANING IMPLEMENT

Eskil F. Segerblom, Minneapolis, Minn.

Application February 23, 1954, Serial No. 411,634

1 Claim. (Cl. 132—92)

This invention relates to tooth cleaning implements, and more specifically to a combined dental floss retainer and applicator.

It is inconvenient for a person to hold a length of dental floss in his hands while using it to dislodge foreign matter collected between his teeth. Implements of various types have been developed which will hold a taut length of dental floss for cleaning teeth, and which will hold a supply of dental floss for replenishing that which is used. Each of such implements, however, have had some serious disadvantages. This is true because most of such implements have been unduly complicated for the simple functions that are to be performed. Also, unnecessary handling of the dental floss is required in some such implements to replace used dental floss with new. Such excessive handling of the dental floss is inconvenient and is unsanitary.

One of the objects of my invention is to provide novel apparatus for holding dental floss which is of inexpensive and extremely simple construction and operation.

Another object of my invention is to provide improved apparatus having a minimum of parts and which will hold a length of dental floss taut and will readily and easily release the dental floss.

Still another object of my invention is to provide ameliorated apparatus for holding a taut length of dental floss and which requires a minimum of handling of the dental floss to replace such a length of the same.

A further object of my invention is to provide new apparatus for holding a taut length of dental floss for teeth cleaning and which will carry a supply of dental floss for replacing such a length thereof, and which will positively guide the dental floss when a new length of the same is pulled into operating position.

A still further object of my invention is to provide an improved apparatus for holding a taut strand of dental floss and which may be readily and easily taken apart, cleaned, inspected and reassembled.

These and other objects and advantages of my invention will more fully appear from the following description made in connection with the accompanying drawings wherein like reference characters refer to the same parts throughout the several views and in which.

Figures 1, 2, 3:
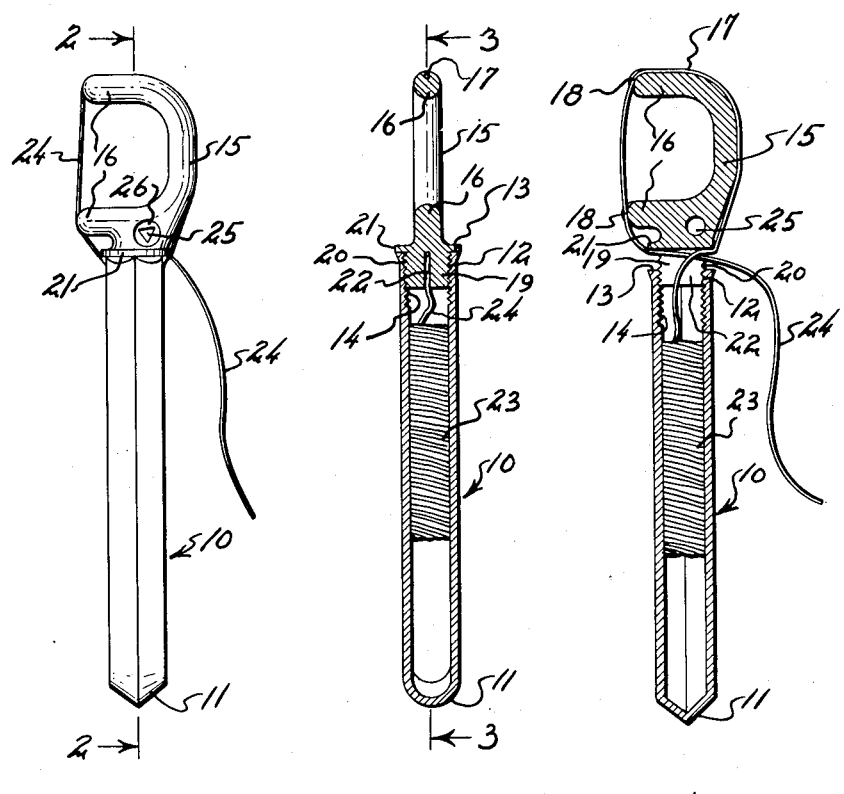
Figure 1 is a side elevational view of my invention.
Figure 2 is a cross-sectional view of my invention taken at 2—2 of Figure 1.
Figure 3 is a cross-sectional view of my invention taken at 3—3 of Figure 2.

Disclosed herein is a dental tool constituting a tooth cleaning implement. The whole tool may be constructed of the same material, except as hereinafter designated, which may be any cheap and light-weight rigid material such as plastic which may be easily molded in manufacturing.

My invention includes an elongated tubular handle 10 or hollow cylinder having one closed end 11 and an open end 12 which defines a transverse annular end surface 13. The open end 12 of the tubular handle 10 has internal threads 14.

A frame element 15 comprises a yoke or rigidly interconnected finger member having spaced apart and adjacent free end portions 16 or cross members which extend in substantially the same direction, being substantially parallel to one another. The body member of the yoke 15 and the parallel ends 16 lie in the plane in which the axis of the tubular handle 10 lies. The frame 15 or yoke has a guiding means thereon, such as guide recesses 17 and 18. Recess 17 extends around the outer periphery of the yoke 15 and lies substantially in the plane in which the axis of the tubular handle 10 lies. The recess 17 is slender and shallow so as to be adapted to carry a strand of dental floss and to guide the same around the outer periphery of the yoke 15. Guide recesses 18 extend laterally across the end portions 16 of the yoke 15 and are aligned with the recess 17. Recesses 18 are substantially similar in shape and size to recess 17 so as to be adapted to engage and carry a strand of dental floss which is extended and stretched across, and between the end portions 16 of the yoke 15.

I also provide interconnecting means, such as nipple 19 and the threaded open end 12 of the handle 10, the latter of which constitutes a sleeve. The cylindrical nipple 19 is fixedly attached to, and may be integral of, the yoke 15. The nipple 19 extends generally transversely of one of the end portions 16 of the yoke 15 and extends outwardly from said end portions 16 and has its axis coextending with the axis of the tubular member 10. The nipple 19 has external threads 20 formed thereon to the outer end thereof which are of such size and configuration so as to match the internal threads 14 of the tubular handle 10. The nipple 19 is threadably connected in the open end 12 of the tubular handle 10. The frame or yoke 15 is thereby removably mounted on the handle 10.

An annular flange 21 is fixedly mounted on the nipple 19 and adjacent to the yoke 15. The flange 21 extends outwardly from the external threads 20 of the nipple 19 and extends around the outer periphery of the nipple 19. When the tubular handle 10 is screwed onto the nipple 19, the annular end surface 13 will peripherally engage the flange 21, in strand-clamping relationship.

A slot 22 or passage extends transversely through the nipple 19 and lies in one of the diameters thereof. The slot 22 extends substantially the entire length of the nipple 19 from the flange 21 to the opposite end of the nipple 19. The width of the slot 22 is substantially equal to or slightly greater than the thickness of a strand of dental floss so as to be adapted to carry and freely guide such a strand of dental floss from the interior of the tubular handle 10 to the exterior of the same.

A supply of dental floss 23, in the form of a coiled strand, is carried in the hollow interior of the tubular handle 10. The dental floss 23 has a free end 24 which extends from the hollow interior of the tubular handle 10 through the slot 22 and outwardly of the nipple 19 and handle 10. The free end 24 of the dental floss 23 is thereafter extended through the strand-guiding recess 17 which carries the free end 24 around the outer periphery of the yoke 15; and the free end 24 is thence extended through the recesses 18 which carry the free end 24 across and between the end portion 16 of the yoke 15; and the free end 24 of the dental floss is then passed through the recess 22 and transversely through the nipple 19 so as to pass between the flange 21 and the annular end surface 13 of the tubular handle 10 to hang freely exteriorly of the handle 10. The free end 24 of the dental floss may be pulled tautly about the outer periphery of the yoke 15 so as to provide a substantially rigid length of dental floss extending between the end portions 16 of the yoke 15. The free end 24 of the dental floss may then be clamped between the flange 21 and the annular end surface 13 of the tubular handle 10.

I also provide a tapered aperture 25 extending through the yoke 15 and positioned adjacent the nipple 19. A circular strand-cutting plate 26 is pressed into the periphery of the aperture 25. The plate 26 has a sharp-cornered opening therethrough formed in any suitable configuration such as a triangle. The inner edges of the plate 26 which define the openings therethrough may be sharpened so as to provide efficient strand-cutting means.

In operation, when the tool has been threaded with a length of dental floss and has a supply of the same stored therein, a new length of dental floss may be pulled into position between the end portions 16 of the yoke 15 with a minimum number of steps to the operation. The yoke 15 and nipple 19 are turned through an arc relative to the tubular handle 10 so as to separate the flange 21 and the annular surface 13 and to loosen the free end of dental floss which extends therebetween and is clamped thereby. When the free end of dental floss has been loosened, it need be merely pulled to supply a new and clean length of dental floss into operating position between the end portions 16 of the yoke 15 from the coiled supply in the handle 10. When such a new length of dental floss is pulled into operating position and is taut around the periphery of the yoke 15, the yoke 15 and nipple 19 may be turned through an arc relative to the tubular handle 10 so as to provide shifting of the flange 21 toward the annular end surface 13 which will securely clamp the dental floss extending therebetween. The used length of dental floss may then be turned in a complete convolution around the exterior of the handle 10 and then passed through the strand-cutting plate 26. A light pull on the end of the used length of dental floss will cause it to be severed by the plate 26.

The tool is operated in cleaning teeth by pulling a new and clean length of dental floss into operating position between the end portions of the string. The handle is gripped by a person's hand and the yoke is inserted into the person's mouth with the end portions of the yoke on opposite sides of the row of teeth. The tool is then manipulated so as to insert the taut length of dental floss between two teeth down and adjacent the gum thereof and then the dental floss may be worked around therein to loosen foreign matter and may be pulled out. This is substantially the same method of teeth cleaning as is used wherein the dental floss is held manually without use of a tool.

It will be seen that I have provided novel apparatus for holding a taut length of dental floss and which is of inexpensive and extremely simple construction and operation. The apparatus may be constructed of inexpensive materials which may be molded in a minimum of operations. Operation of the apparatus is accomplished by a minimum of manipulation of the parts thereof.

It will also be apparent that I have provided an improved apparatus which will hold a taut length of dental floss and which has a minimum number of parts for holding and releasing the dental floss. Because there is a minimum number of parts, the apparatus will be extremely cheap to manufacture at a high rate of production. The parts of the apparatus will readily and easily hold and release the dental floss held thereby.

It should also be observed that I have provided a new apparatus for holding a taut length of dental floss for teeth cleaning and which will positively guide the dental floss when a new length of the same is pulled into operative position and thereby preclude the necessity of excessive handling of the dental floss when a length of the same is to be replaced. The positive guiding feature of my apparatus obviates the need for re-threading the tool each time a new length of dental floss is to be supplied to the working portion thereof.

It should also be apparent that I have provided an improved apparatus for holding a taut strand of dental floss which may be easily and readily taken apart, cleaned, reinspected, and reassembled. The simplicity of construction of my apparatus provides for a rapid knockdown and reassembly of my apparatus which is necessary if the apparatus for cleaning teeth is to be kept in a sanitary condition. A sanitary condition, which is highly desirable for an apparatus which is to be used in the mouth, is easily facilitated by the simplicity of disassembling and assembly.

It will, of course, be understood that various changes may be made in the form, details, arrangement and proportion of the parts without departing from the scope of my invention.

What I claim is:

A tooth cleaning implement for use with a strand of dental floss and the like, said implement having in combination a longitudinally extending tubular handle having a closed end and an internally threaded open and an annular end surface adjacent said open end, an externally threaded nipple being threadedly mounted in said open end of said handle and having an external annular flange fixedly mounted thereon and peripherally engaging said annular surface in strand-clamping relationship, a rigid yoke having spaced apart parallel end portions extending transversely of said handle and in the plane of the axis thereof, said yoke having aligned strand-guiding recesses extending across the end portions thereof and around the outer periphery thereof, said nipple being fixedly attached to one of said yoke end portions and having a strand-guiding slot extending the length thereof to said flange and extending transversely therethrough in the plane of said guiding recesses in said yoke, whereby when a supply of dental floss is carried in said tubular handle, a strand may pass out of said nipple slot, around the periphery and between the end portions of said yoke, and transversely through said nipple slot again to be clamped between said flange and said annular end surface of said handle.

References Cited in the file of this patent

UNITED STATES PATENTS

| 906,651 | Nichols | Dec. 15, 1908 |
| 1,161,043 | Gallas | Nov. 23, 1915 |
| 1,239,633 | Stickler | Sept. 11, 1917 |
| 1,468,942 | Gamble | Sept. 25, 1923 |
| 1,494,679 | Fischer et al. | May 20, 1924 |
| 1,952,358 | Bohm | Mar. 27, 1934 |
| 2,067,692 | Cammack | Jan. 12, 1937 |
| 2,113,439 | Bean | Apr. 5, 1938 |
| 2,516,539 | Atols | July 25, 1950 |
| 2,644,469 | Cohen | July 7, 1953 |